United States Patent
Volk

(10) Patent No.: US 11,858,124 B2
(45) Date of Patent: Jan. 2, 2024

(54) QUICK-CHANGE SYSTEM FOR GRIPPER JAWS

(71) Applicant: Schaeffler Technologies AG & Co. KG, Herzogenaurach (DE)

(72) Inventor: Wolfgang Volk, Frensdorf (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 17/613,606

(22) PCT Filed: Jun. 23, 2020

(86) PCT No.: PCT/DE2020/100532
§ 371 (c)(1),
(2) Date: Nov. 23, 2021

(87) PCT Pub. No.: WO2020/259756
PCT Pub. Date: Dec. 30, 2020

(65) Prior Publication Data
US 2022/0234219 A1 Jul. 28, 2022

(30) Foreign Application Priority Data
Jun. 28, 2019 (DE) .................... 10 2019 117 458.9

(51) Int. Cl.
B25J 15/04 (2006.01)
(52) U.S. Cl.
CPC .................... B25J 15/0475 (2013.01)
(58) Field of Classification Search
CPC ....... B25J 15/0475; B25J 15/08; B25J 15/083

USPC ........................................... 294/119.1, 86.29
See application file for complete search history.

(56) References Cited

U.S. PATENT DOCUMENTS

| 4,466,650 | A | * | 8/1984 | Roedel | A63B 47/02 |
| | | | | | 294/19.2 |
| 4,707,013 | A | * | 11/1987 | Vranish | B25J 15/026 |
| | | | | | 901/39 |
| 8,322,766 | B1 | | 12/2012 | Hsiung et al. | |
| 9,796,096 | B2 | * | 10/2017 | Williams | B25J 15/0028 |
| 11,364,640 | B1 | * | 6/2022 | Markus | B25J 15/0408 |
| 2009/0127879 | A1 | * | 5/2009 | Maffeis | B25J 15/028 |
| | | | | | 294/207 |
| 2009/0235755 | A1 | * | 9/2009 | Smallwood | G01N 3/04 |
| | | | | | 73/856 |

(Continued)

FOREIGN PATENT DOCUMENTS

| CN | 202758155 U | 2/2013 |
| CN | 105666512 A | 6/2016 |

(Continued)

*Primary Examiner* — Paul T Chin

(57) ABSTRACT

A quick-change system includes a first exchange tool designed as gripper jaws, a second exchange tool, a first receiving part, and a ball catch. The first receiving part includes a first receiving opening for receiving a one of the first exchange tool or the second exchange tool. The ball catch is for temporarily fixing the one of the first exchange tool or the second exchange tool on the first receiving part. The ball catch includes a sleeve that is closed on one side and a spring-mounted press ball arranged in the sleeve. The one of the first exchange tool or the second exchange tool has a ball-receiving opening, and the press ball can be manually engaged and disengaged in the ball-receiving opening.

9 Claims, 2 Drawing Sheets

(56) References Cited

U.S. PATENT DOCUMENTS

| | | | |
|---|---|---|---|
| 2011/0221216 A1* | 9/2011 | Wray | B66C 1/36 |
| | | | 294/82.17 |
| 2013/0181469 A1 | 7/2013 | Williams et al. | |
| 2021/0178609 A1* | 6/2021 | Norton | B25J 15/0433 |
| 2022/0234118 A1* | 7/2022 | Volk | B23B 31/1071 |

FOREIGN PATENT DOCUMENTS

| | | |
|---|---|---|
| CN | 109311652 A | 2/2019 |
| CN | 109449673 A | 3/2019 |
| DE | 29906328 U1 | 6/1999 |
| DE | 10304507 B3 | 10/2004 |
| DE | 102011054201 A1 | 4/2013 |

\* cited by examiner

QUICK-CHANGE SYSTEM FOR GRIPPER JAWS

CROSS-REFERENCE TO RELATED APPLICATIONS

This application is the United States National Phase of PCT Appln. No. PCT/DE2020/100532 filed Jun. 23, 2020, which claims priority to German Application No. DE102019117458.9 filed Jun. 28, 2019, the entire disclosures of which are incorporated by reference herein.

TECHNICAL FIELD

The present disclosure relates to a quick-change system including at least one receiving part and at least two exchange tools, the receiving part having at least one receiving opening for receiving a respective exchange tool.

BACKGROUND

Quick-change systems of the type mentioned at the outset are known, for example, from DE 103 04 507 D1. The tool changing system described therein is designed for detachable coupling of tools to handling equipment. This includes an exchange head, an exchange adapter, and locking means for locking the exchange head to the exchange adapter. The locking means comprise an elastically deformable actuating member which, in the locked state, acts on locking members in a resiliently pretensioned manner such that the locking members are held in their respective locking position.

SUMMARY

The present disclosure provides an alternative quick-change system that requires little installation space. A disclosure also specifies a place of use and a use for such a quick-change system.

The disclosed quick-change system includes at least one receiving part and at least two exchange tools. The receiving part has at least one receiving opening for receiving one or each exchange tool, and the exchange tool is designed as gripper jaws. At least one ball catch is provided for temporarily fixing the exchange tool on the receiving part. The ball catch includes a sleeve that is closed on one side, in which a spring-mounted press ball is arranged, and the press ball can be manually engaged in a ball-receiving opening on the exchange tool and disengaged again.

The quick-change system is space-saving and it can be used without the need for another tool. Manual engagement and disengagement of the exchange tool is possible, as the holding forces between the exchange tool and the receiving part can be kept within a manually manageable range. Thus, machines with such quick-change systems can be converted quickly and require little manpower.

A ball-receiving opening is understood to mean, for example, a recess, a blind hole, a cutout, a through hole, an incision, a groove and the like, which is dimensioned in such a way that it is possible to engage a correspondingly arranged press ball.

In an example embodiment, the sleeve, which is closed on one side, has an axis of symmetry S, and the press ball is displaceable along the axis of symmetry S. The ball-receiving opening has a central axis M which runs parallel to the axis of symmetry S in an engaged state of the receiving part and exchange tool. In an example embodiment of the quick-change system according to the disclosure, the axis of symmetry S and the central axis M run parallel at a distance A of 1 to 3.5 mm in the engaged state. By adjusting the distance A between the axis of symmetry S and the central axis M in the engaged state, the holding forces perpendicular to the spring action between the exchange tool and the receiving part can be set to a manageable level. The smaller the distance A, the lower the holding force. Holding forces in a range from 5 to 50 N can be set.

The receiving part and the exchange tool can be engaged in such a way that the exchange tool can be pushed into the receiving opening in an engagement direction which runs perpendicular to the axis of symmetry S.

At least one exchange tool stop may be formed on the exchange tool, which enables the vertical position of the exchange tool to be fixed in the receiving opening. Two exchange tool stops may be provided, which reliably prevent the exchange tool from moving inside the receiving opening.

The ball-receiving opening may have a contact area which, in the engaged state, touches the press ball, the contact area being provided with an edge break, also called a chamfer. An edge break in a range from 0.2 to 0.4 mm has proven effective in this regard. The edge break here indicates the length of the distance between each of the two chamfer edges formed and the edge of the ball-receiving opening that was originally present (and removed when the chamfer was inserted).

The quick-change system may have two receiving parts which are arranged on a holder and can be moved towards one another. For example, a motor drive or a pneumatic drive of the receiving parts may be provided in order to move them, including the exchange tools engaged therein in the form of gripper jaws, towards each other and to clamp and hold a component between them by means of the gripper jaws. In order to release the gripper jaws from the component again, they can be moved back into their starting position. The two receiving parts can be moved relative to each other or be swiveled toward each other about a common axis of rotation.

Alternatively, the two exchange tools are arranged to be movable towards one another on only one receiving part. For this purpose, the receiving part can include, for example, an area which is elastically deformable by means of a motor drive or a pneumatic drive. In order to move the exchange tools in the form of gripper jaws towards one another and to clamp and hold a component between them by means of the gripper jaws, the receiving part is elastically deformed. To release the gripper jaws from the component again, they can be moved back to their starting position by resetting the elastic deformation of the receiving part.

Use of the quick-change system according to the disclosure for mounting rolling bearings or plain bearings or for machining rolling bearing or plain bearing components has proven successful. Furthermore, the use of such a quick-change system for the assembly or processing of motor components has proven to be advantageous.

BRIEF DESCRIPTION OF THE DRAWINGS

FIG. 1 shows a first quick-change system in a three-dimensional view,

FIG. 2 shows a single ball catch with an engaged press ball as an enlarged view in a sectional view, FIG. 3 shows a receiving part for a further quick-change system in a three-dimensional view, and FIG. 4 shows a section through the further quick-change system with the receiving part according to FIG. 3 in a three-dimensional view.

DETAILED DESCRIPTION

Figure 1:
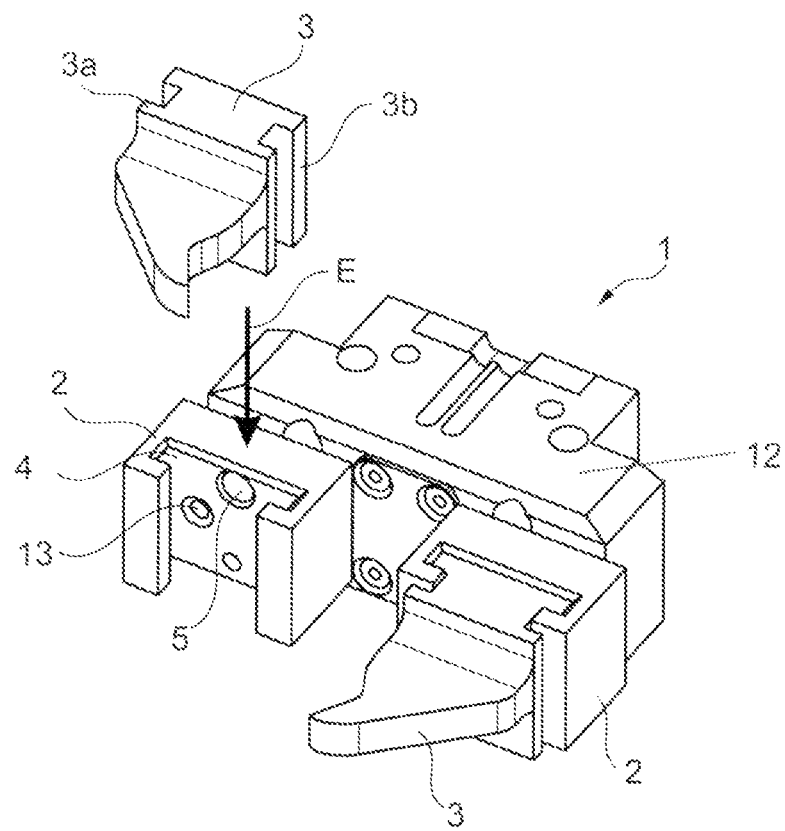
FIGS. 1 to 4 are intended to illustrate quick-change systems according to the disclosure by way of example. In the figures.

FIG. 1 shows a quick-change system 1 in a three-dimensional view. The quick-change system 1 here includes two receiving parts 2 and two exchange tools 3, each receiving part 2 having a receiving opening 4 for receiving the respective exchange tool 3. The exchange tools 3 are designed as gripper jaws. For each receiving part 2, there is also one ball catch 5 for temporarily fixing the respective exchange tool 3 on the receiving part 2. Each ball catch 5 includes a sleeve 6 closed on one side (see FIG. 2), in which a spring-mounted press ball 7 is arranged. The press balls 7 can each be manually engaged in a ball-receiving opening 8 on the exchange tool 3 and can also be disengaged from these again, for example to be able to quickly change to a differently dimensioned exchange tool. The exchange tool 3 is moved manually towards the receiving part 2 in the engagement direction E for engaging with the receiving part 2. The exchange tool stops 3a, 3b provided here on the exchange tool 3 are brought to bear above and below the receiving part 2 and the exchange tool 3 is pushed into the receiving opening 4 until the press ball 7 engages in the ball-receiving opening 8.

FIG. 1 shows, on the left side, the state before the exchange tool 3 engages with the receiving part 2 and, on the right side, the state of the exchange tool 3 after it has engaged with the receiving part 2. The receiving parts 2 are arranged on a holder 12. The receiving parts 2 are mounted on the holder 12 by means of screw connections 13 here.

Figure 2:
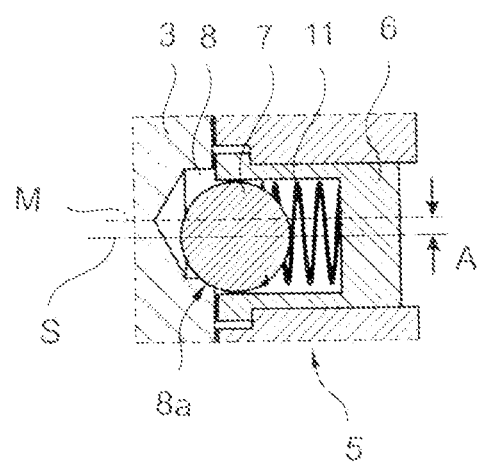

FIG. 2 shows a single ball catch 5 as an enlarged view in a sectional view. The sleeve 6, which is closed on one side, can be seen, in which a press ball 7, which is spring-mounted by means of a spring element 11, is arranged. The sleeve 6 has an axis of symmetry S, the press ball 7 being displaceable along the axis of symmetry S. A helical compression spring is provided here as the spring element 11, but other types of spring elements such as conical springs, disc springs, elements formed from an elastomer and the like can also be used.

Above the ball catch 5, a section of the exchange tool 3 can be seen, here in the area of a ball-receiving opening 8 in the form of a blind hole. The ball-receiving opening 8 has a central axis M which, when the receiving part 2 and the exchange tool 3 are in an engaged state, runs parallel to the axis of symmetry S, as shown here.

The axis of symmetry S and the central axis M run parallel to one another at a distance A in the range from 1 to 3.5 mm in the engaged state. The selection of the distance A has a direct influence on the holding force between the exchange tool 3 and the receiving part 2 in the engaged state. At least in the contact area 8a, in which an edge of the ball-receiving opening 8 would come into contact with the surface of the press ball 7, the ball-receiving opening 8 has an edge break. The choice of the size of the edge break also has an influence on the holding force between the exchange tool 3 and the receiving part 2 in the engaged state. The final constructive design for the holding force required in the respective application can be determined on the basis of a few tests.

Figure 3:
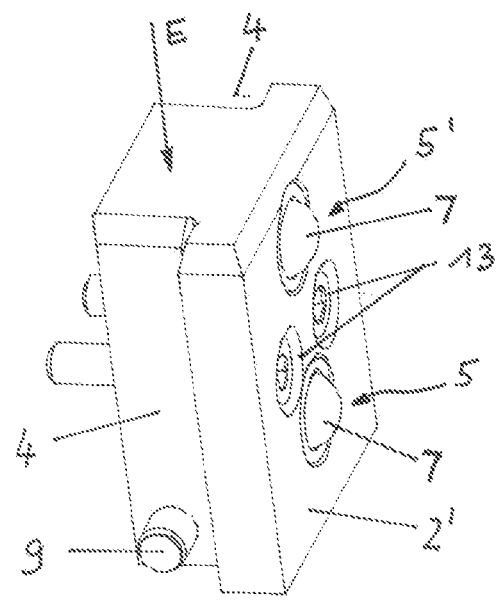
Figure 4:
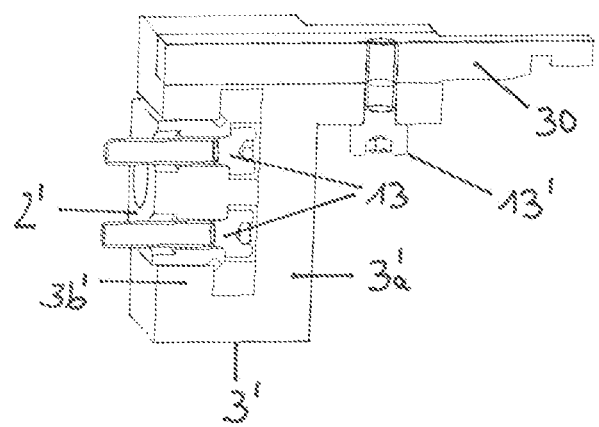

FIG. 3 shows a receiving part 2' for a further quick-change system (cf. FIG. 4) in a three-dimensional view. FIG. 4 shows a section through a part of such a further quick-change system (only one gripper jaw shown here, arrangement of two receiving parts 2' also provided here as in FIG. 1 on a holder 12) with receiving part 2' according to FIG. 3 in a three-dimensional view. The receiving part 2' here has two ball catches 5 for the temporary fixation of an exchange tool 3' on the receiving part 2'. Each ball catch 5 includes a sleeve 6 closed on one side (see FIG. 2), in which a spring-mounted press ball 7 is arranged. The press balls 7 can each be manually engaged with a ball-receiving opening 8 on the exchange tool 3' and can also be disengaged from these again, for example to be able to quickly change to a differently dimensioned exchange tool.

The receiving part 2' also has two receiving openings 4. The exchange tool 3' is moved manually towards the receiving part 2' in the engagement direction E in order to engage with the receiving part 2'. The exchange tool stops 3a', 3b' provided here on the exchange tool 3' are brought to bear above and below the receiving part 2' in the area of the receiving openings 4 and the exchange tool 3' is pushed on until the press balls 7 of the ball catches 5 engage with the corresponding ball-receiving openings (not visible here) on exchange tool 3' and a stop 9 is reached.

The exchange tool 3' here comprises a gripper jaw 30 which can be mounted separately via a further screw connection 13'. To form a further quick-change system, two such receiving parts 2' are mounted on a holder 12 (see FIG. 1) by means of the screw connections 13 and each provided with an exchange tool 3' (each comprising a gripper jaw 30).

Only two exemplary embodiments for the formation of quick-change systems according to the disclosure are shown here, but further embodiments as described above are possible according to the present disclosure.

REFERENCE NUMERALS

1 Quick-change system
2, 2' Receiving part
3, 3' Exchange tool
3a, 3b, 3a', 3b' Exchange tool stop
30 Gripper jaw
4 Receiving opening
5 Ball catch
6 Sleeve
7 Press ball
8 Ball-receiving opening
8a Contact area
9 Stop
11 Spring element
12 Holder
13, 13' Screw connection
A Distance
S Axis of symmetry
M Central axis
E Engagement direction

The invention claimed is:
1. A quick-change system comprising:
a first exchange tool designed as gripper jaws;
a second exchange tool;
a first receiving part comprising a first receiving opening for receiving one of the first exchange tool or the second exchange tool; and
a ball catch for temporarily fixing the one of the first exchange tool or the second exchange tool on the first receiving part, the ball catch comprising:
a sleeve that is closed on one side; and
a spring-mounted press ball arranged in the sleeve, wherein:

the one of the first exchange tool or the second exchange tool comprises a ball-receiving opening; and the press ball can be manually engaged and disengaged in the ball-receiving opening when the one of the first exchange tool or the second exchange tool is disposed in the first receiving opening.

2. The quick-change system of claim 1, wherein:
the sleeve comprises an axis of symmetry;
the press ball is displaceable along the axis of symmetry; and
the ball-receiving opening comprises a central axis that runs parallel to the axis of symmetry when the press ball is engaged in the ball-receiving opening.

3. The quick-change system of claim 2, wherein the axis of symmetry and the central axis run parallel at a distance of 1 mm to 3.5 mm when the press ball is engaged in the ball-receiving opening.

4. The quick-change system of claim 2 wherein the one of the first exchange tool or the second exchange tool is arranged to be inserted into the first receiving opening in an engagement direction that is perpendicular to the axis of symmetry.

5. The quick-change system of claim 1 wherein:
the ball-receiving opening comprises a contact area arranged to contact the press ball when the press ball is engaged in the ball-receiving opening; and
the contact area comprises an edge break.

6. The quick-change system of claim 1, further comprising:
a holder; and
a second receiving part, wherein:
the first receiving part and the second receiving part are arranged on the holder; and
the first receiving part and the second receiving part are movable towards one another.

7. The quick-change system of claim 1 wherein:
the one of the first exchange tool or the second exchange tool is installed in the first receiving opening;
the first receiving part comprises a second receiving opening;
the other of the first exchange tool or the second exchange tool is installed in the second receiving opening; and
the first exchange tool and the second exchange tool are movable towards one another.

8. The quick-change system of claim 1 wherein the spring-mounted press ball extends at least partially into the first receiving opening.

9. The quick-change system of claim 1 wherein:
the first receiving part comprises a hole with a counterbore; and
the sleeve comprises:
a cylindrical portion disposed in the hole; and
an annular portion disposed in the counterbore.

* * * * *